(12) United States Patent
Kharlampieva et al.

(10) Patent No.: US 9,074,034 B2
(45) Date of Patent: Jul. 7, 2015

(54) MULTILAYER HYDROGELS WITH PH-RESPONSIVE SWELLING AND SURFACE WETTABILITY

(71) Applicants: The UAB Research Foundation, Birmingham, AL (US); The US Army Corp of Engineers, Champaign, IL (US)

(72) Inventors: Eugenia P. Kharlampieva, Birmingham, AL (US); Veronika Kozlovskaya, Birmingham, AL (US); Yun Wang, Birmingham, AL (US); Donald Cropek, Champaign, IL (US); Imee Arcibal, Champaign, IL (US)

(73) Assignees: The UAB Research Foundation, Birmingham, AL (US); The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/798,870

(22) Filed: Mar. 13, 2013

(65) Prior Publication Data

US 2014/0193651 A1    Jul. 10, 2014

Related U.S. Application Data

(60) Provisional application No. 61/749,579, filed on Jan. 7, 2013.

(51) Int. Cl.

| | | |
|---|---|---|
| B32B 27/08 | (2006.01) |
| B05D 3/12 | (2006.01) |
| C08F 226/06 | (2006.01) |
| C09D 5/00 | (2006.01) |
| B05D 5/00 | (2006.01) |
| B05D 7/00 | (2006.01) |
| B05D 3/10 | (2006.01) |
| B05D 5/04 | (2006.01) |
| B05D 5/08 | (2006.01) |
| B05D 1/00 | (2006.01) |
| B05D 1/18 | (2006.01) |

(52) U.S. Cl.
CPC .............. *C08F 226/06* (2013.01); *B05D 5/00* (2013.01); *B05D 7/50* (2013.01); *C09D 5/00* (2013.01); *B05D 3/107* (2013.01); *B05D 5/04* (2013.01); *B05D 5/08* (2013.01); *B05D 7/52* (2013.01); *B05D 7/56* (2013.01); *B05D 1/005* (2013.01); *B05D 1/185* (2013.01)

(58) Field of Classification Search
None
See application file for complete search history.

(56) References Cited

U.S. PATENT DOCUMENTS

2005/0011826 A1    1/2005  Childs et al.
2010/0133101 A1    6/2010  Pamidi et al.

FOREIGN PATENT DOCUMENTS

WO       2012075033 A2    6/2012

OTHER PUBLICATIONS

The International Search Report and Written Opinion dated Nov. 19, 2013.
Kozlovskaya, et al., "Ultrathin Layer-by-Layer Hydrogels with Incorporated Gold Nanorods as pH-Sensitive Optical Materials," Chemistry of Materials, Nov. 26, 2008, vol. 20, No. 24, pp. 7474-7485.
Gil, et al., "Stimuli-REsponsive Polymers and their Bioconjugates," Progress in Polymer Science, Sep. 26, 2004, vol. 29, pp. 1173-1222.
Guenther, et al.,"Chemical Sensors Based on Multiresponsive Block Copolymer Hydrogels," Sensors and Actuators B, Nov. 22, 2006, vol. 126, pp. 97-106.
Galvin, et al., "Applications of Surface-Grafted Macromolecules Derived from Post-Polymerization Modification Reactions," Progress in Polymer Science, Dec. 7, 2011, vol. 37, Issue 7, pp. 871-906.
Beines, et al., "Responsive Thin Hydrogel Layers from Photo-Cross-Linkable Poly(N-isopropylacrylamide) Terpolymers," Langmuir, 2007, vol. 23, 99. 2231-2238.
Kozlovskaya, et al. (2013). Tailoring Architecture of Nanothin Hydrogels: Effect of Layering on pH-Triggered Swelling. ACS Macro Lett. 2013, 2, 226-229.
Wang, et al. (2013). Highly swellable ultrathin poly(4-vinylpyridine) multilayer hydrogels with pH-triggered surface wettability. Soft Matter, 2013, 9, 9420-9429.

*Primary Examiner* — Sheeba Ahmed
(74) *Attorney, Agent, or Firm* — Thomas Horstemeyer, LLP

(57) ABSTRACT

A novel type of ultrathin cationic hydrogel coatings are provided that have high, quick and reversible swelling/shrinkage transitions and surface wettability in response to pH changes. The poly(4-vinyl pyridine) (PVP) hydrogel films are produced by selective cross-linking of PVP copolymers in layer-by-layer (LbL) films assembled by spin-assisted method. These multilayer hydrogels exhibit drastic and reversible 10-fold swelling when the pH is changed from neutral to acidic. The swelling amplitude of these coatings is controlled by varying cross-link densities within the films. The pH-responsive hydrogels open new prospects for developing "intelligent" materials with sharp stimuli-triggered responses for applications in sensing, transport regulation, and self-cleaning coatings.

16 Claims, 11 Drawing Sheets

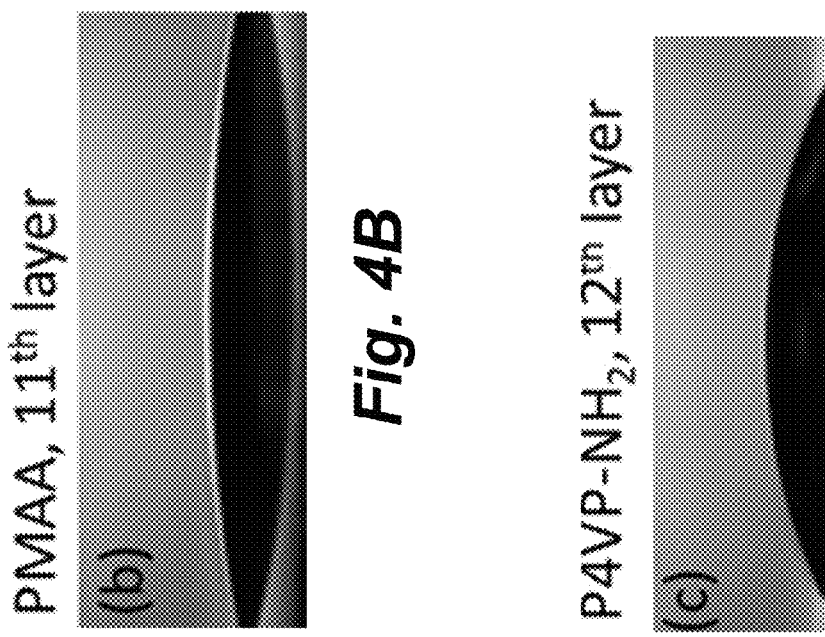
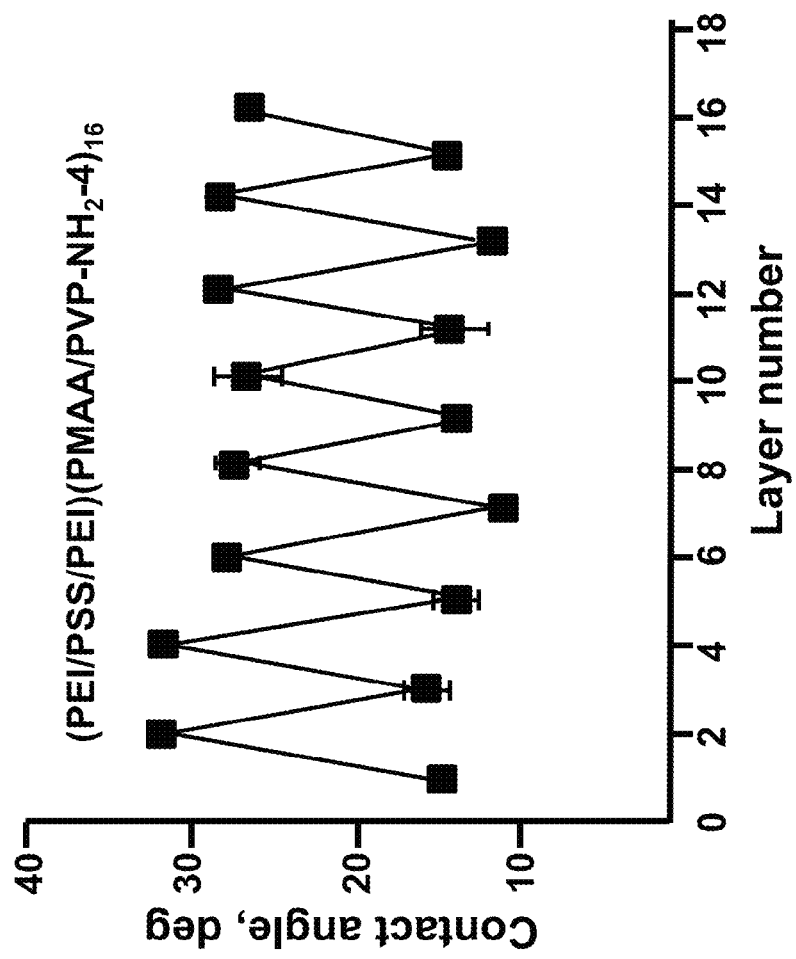
Fig. 4A
Fig. 4B
Fig. 4C

MULTILAYER HYDROGELS WITH PH-RESPONSIVE SWELLING AND SURFACE WETTABILITY

CROSS-REFERENCE TO RELATED APPLICATIONS

This application claims priority to U.S. Provisional Patent Application Ser. No. 61/749,579 entitled "HIGHLY SWELLABLE ULTRATHIN MULTILAYER HYDROGELS OF POLY (4-VINYLPYRIDINE) WITH pH-TRIGGERED SWELLING AND SURFACE WETTABILITY" and filed Jan. 7, 2013, the entirety of which is hereby incorporated by reference.

STATEMENT ON FUNDING PROVIDED BY THE U.S. GOVERNMENT

This invention was made with government support under Grant No. 2010208 awarded by the U.S. Army Corps of Engineers. The government has certain rights in the invention.

TECHNICAL FIELD

The present disclosure is generally related to spin-assisted layer-by-layer hydrogel compositions that swell in response to low-pH conditions. The present disclosure further relates to methods of generating said hydrogel compositions.

BACKGROUND

Stimuli-responsive coatings (Zhang & Han (2010) *Chem. Soc. Revs.* 39: 676-; Mendes P. M. (2010) *Chem. Soc. Revs.* 37: 2512; Roy et al., (2010) *Prog. Polymer Sci.* 35: 278; Nandivada et al., (2010) *Prog. Polymer Sci.* 35: 141; Motornov et al., (2010) *Prog. Polymer Sci.* 35: 174; Liu & Urban (2010) *Prog. Polymer Sci.* 35: 3; Lee et al., (2010) *Prog. Polymer Sci.* 35; Bajpai et al., (2008) *Prog. Polymer Sci.* 33: 1088; Gil & Hudson, S. M. *Prog. Polymer Sci.* 29: 1173) also known as "intelligent surfaces", are capable of responding to small changes in environmental conditions such as pH, temperature, ionic strength, electric field and biomolecule concentrations. Surface coatings with controlled properties such as wettability (Zhang & Han (2010) *Chem. Soc. Revs.* 39: 676; Xin & Hao (2010) *J. Chem. Soc. Revs.* 39, 769; Chen et al., (2010) *Prog. Polymer Sci.* 35: 94; Li et al., (2007) *Chem. Soc. Revs.* 36: 1350) that can switch between hydrophilic and hydrophobic are of particular interest in the development of chemical and biological sensors (Zhang & Han (2010) *Chem. Soc. Revs.* 39: 676-; Mendes P. M. (2010) *Chem. Soc. Revs.* 37: 2512), anti-fog devices, and porous membranes. Several approaches have been applied to control physical and chemical properties of such coatings, for instance, self-assembled monolayers (SAMs) (Zhang & Han (2010) *Chem. Soc. Revs.* 39: 676-; Mendes P. M. (2010) *Chem. Soc. Revs.* 37: 2512) and polymer brushes (Zhang & Han (2010) *Chem. Soc. Revs.* 39: 676-; Mendes P. M. (2010) *Chem. Soc. Revs.* 37: 2512). However, these methods normally require sophisticated fabrication techniques. Layer-by-layer assembly, on the other hand, simply requires alternative deposition with two solutions onto the surface.

SUMMARY

Briefly described, one aspect of the disclosure encompasses embodiments of a pH-responsive layered composition comprising at least two spin-assisted layer-by-layer spun copolymer layers, where the spun layers have a plurality of cationic side-groups attached thereto, and where the spun layered composition when hydrated swells when protonated and has a reduced volume when deprotonated.

In the embodiments of this aspect of the disclosure, the at least two spin-assisted layer-by-layer spun copolymer layers can be cross-linked.

In the embodiments of this aspect of the disclosure, the at least two spun copolymer layers can be comprised of a polyvinylpyridine polymer.

In the embodiments of this aspect of the disclosure, the at least two copolymer spun layers consist essentially of copolymers ($PVP-NH_2-m$) of poly(4-vinylpyridine-$NH_2$-1), poly(4-vinylpyridine-$NH_2$-4), or poly(4-vinylpyridine-$NH_2$-7).

In the embodiments of this aspect of the disclosure, the at least two copolymer spun layers can be separated by alternating spun copolymer layers comprising a copolymer comprising poly(methacrylic acid).

In the embodiments of this aspect of the disclosure, the cross-linkable side-groups can be carboxylate groups, amino groups, or a combination thereof.

In the embodiments of this aspect of the disclosure, the cross-linkable side-groups can be amino groups.

In the embodiments of this aspect of the disclosure, the copolymer spun layers can be cross-linked with glutaraldehyde.

In the embodiments of this aspect of the disclosure, the pH-responsive layered composition can comprise from 2 to about 50 spun layers, where each of the spun layers comprises a poly(vinylpyridine-$NH_2$) copolymer or alternates with a spun layer that can comprise a poly(methacrylic acid) copolymer.

Another aspect of the disclosure encompasses embodiments of a pH-responsive spin-assisted layer-by-layer layered composition comprising at least two glutaraldehyde-cross-linked spun layers of a copolymer comprising 4-vinylpyridine and having a plurality of amino side-groups attached thereto, and wherein the spun layered composition when hydrated swells when protonated and has a reduced volume when deprotonated.

In the embodiments of this aspect of the disclosure, the pH-responsive layered composition can comprise spun layers of a copolymer consisting essentially of 4-vinylpyridine, and where the layered composition is substantially dehydrated.

Still another aspect of the disclosure encompasses embodiments of a method of forming a pH-responsive composition, the method comprising the steps of: (a) generating a polyvinylpyridine copolymer having a plurality of cationic side-groups attached thereto; (b) generating a layer-by-layer composition by spin-assisted deposition of the polyvinylpyridine copolymer on a support material; and (c) cross-linking the spun layers of the layer-by-layer composition, thereby generating a pH-responsive spin-assisted layer-by-layer layered composition comprising at least two cross-linked spun polyvinylpyridine copolymer layers, where the spun-layered composition when hydrated reversibly swells when protonated.

In the embodiments of this aspect of the disclosure, the method can further comprise the steps of: generating a poly(methacrylic acid) copolymer; spin-assisted deposing the poly(methacrylic acid) copolymer on each of the polyvinylpyridine copolymer layers; cross-linking the polyvinylpyridine copolymer layers; and removing poly(methacrylic acid) copolymer layers under acid conditions.

In the embodiments of this aspect of the disclosure, the support material can be a silicon surface, and wherein the support material can be coated with an agent enhancing the attachment of a copolymer layer to the silicon surface.

In the embodiments of this aspect of the disclosure, the agent coating the silicon surface can be poly(glycidyl-methacrylate).

In the embodiments of this aspect of the disclosure, the pH-responsive spin-assisted layer-by-layer layered composition consists essentially of cross-linked layers of a poly(4-vinylpyridine-$NH_2$).

In the embodiments of this aspect of the disclosure, the method can further comprise the step of drying the spin-assisted layer-by-layer layered composition.

In the embodiments of this aspect of the disclosure, the method can further comprise the step of displacing the composition from the support material.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 4A is a graph illustrating contact angle variations during SA-LBL of the PMAA/PVP-$NH_2$-4 multilayer. The multilayer was deposited on a (PEI/PSS/PEI) precursor layer.

FIG. 4B is a digital image of a water drop placed on the outmost layer of PMAA.

FIG. 4C is a digital image of a water drop placed on the outmost layer of PVP-$NH_2$-4.

Figure 1A:
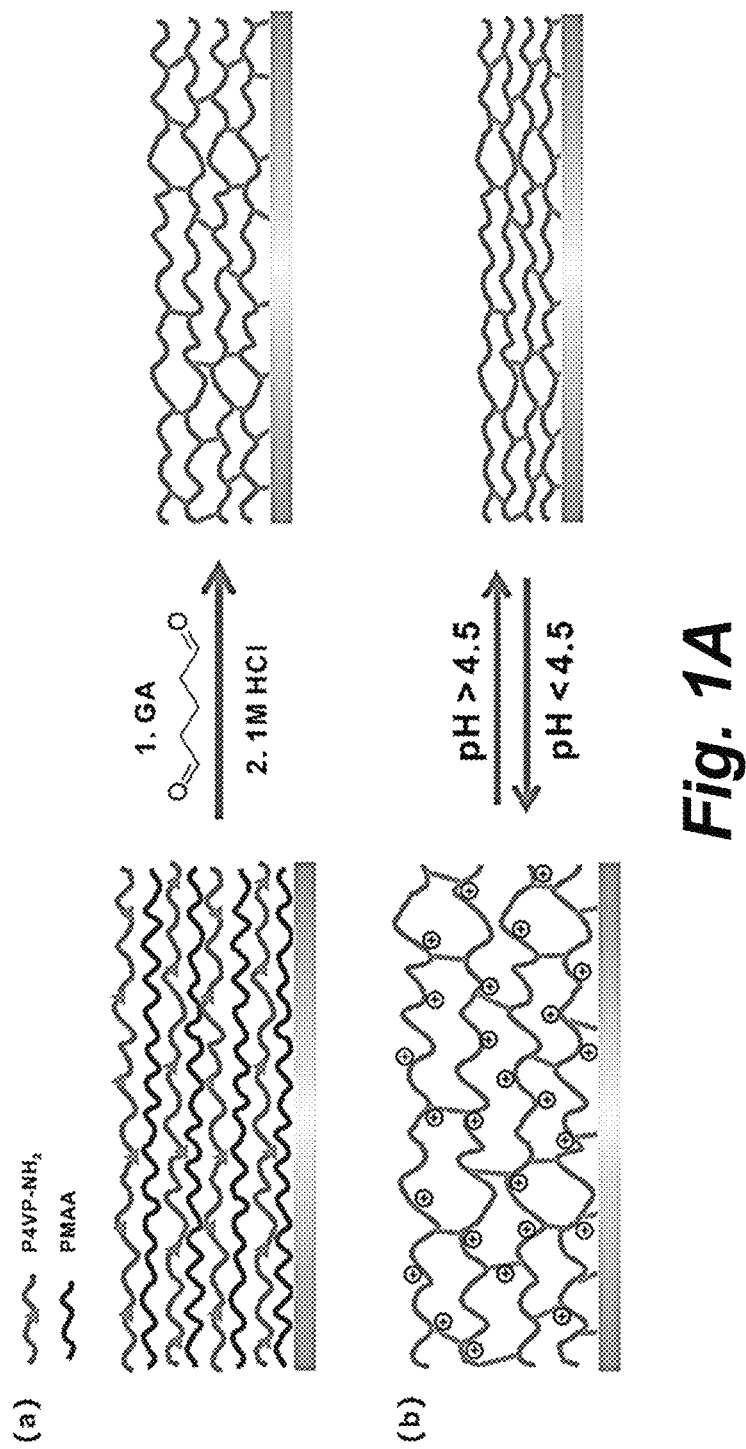
FIG. 1A schematically illustrates the fabrication of PVP LbL hydrogels via cross-linking using glutaraldehyde and the removal of PMAA in 1 M HCl (top), and the reversible swelling/shrinking process of cross-linked PVP LbL hydrogel films (bottom). The multilayers swell at pH of less than about 4.5 and shrink when pH of greater than about 4.5.

The drawings are described in greater detail in the description and examples below.

The details of some exemplary embodiments of the methods and systems of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the following terms have the meanings ascribed to them unless specified otherwise. In this disclosure, "comprises," "comprising," "containing" and "having" and the like can have the meaning ascribed to them in U.S. patent law and can mean "includes," "including," and the like; "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. patent law and allows for the presence of more than that which is recited so long as basic or novel characteristics of that which is recited is not changed by the presence of more than that which is recited, but excludes prior art embodiments.

Prior to describing the various embodiments, the following definitions are provided and should be used unless otherwise indicated.

Abbreviations

LbL, layer-by-layer; SA-LbL, spin-assisted layer-by-layer; PVP, polyvinylpyridine; PMAA, poly(methacrylic acid).

DEFINITIONS

In describing and claiming the disclosed subject matter, the following terminology will be used in accordance with the definitions set forth below.

The term "layer-by-layer (LbL) assembly" as used herein refers to a technique for surface coating that depends on the controllable adsorption of two or more species on a surface through certain type of interactions (Decher & Hong (1991) *Makromolekulare Chemie-Macromolecular Symposia* 46: 321; Decher, G. (1997) *Science* 277: 1232). It has almost no restrictions on the type of interactions between the building blocks (Kharlampieva et al., (2009) *Advanced Mats* 21: 3053; Xu et al., (2007) *Polymer* 48: 1711) from conventional electrostatic forces to unconventional host-guest interactions, or covalent bonding. Further, it can accommodate different types of building blocks (Kharlampieva et al., (2009) *Advanced Mats* 21: 3053; Xu et al., (2007) *Polymer* 48: 1711) such as small molecules, polymers, bio-macromolecules and nanoparticles on a variety of types and shapes of surface templates (Kharlampieva et al., (2009) *Advanced Mats* 21: 3053). The most attractive property of LbL assembly is the well-defined structure of the coatings with controllable and predictable thickness growth from nanometer to millimeter scale (Kharlampieva et al., (2009) *Advanced Mats* 21: 3053; Xu et al., (2007) *Polymer* 48: 1711; Quinn et al., (2007) *Chem. Soc. Revs.* 36: 707; Such et al., (2011) *Chem. Soc. Revs.* 40: 19).

The term "poly(4-vinylpyridine) (P4VP)" as used herein refers to a weak polycation that has been widely employed for the fabrication of pH-responsive materials (Liu et al., (2012) *Mater. Sci. Eng.*, C 32: 953; Li et al., (2012) *Mater. Chem. Phys.* 133: 726; Kang et al., (2012) *J. Phys. Chem. B* 116: 55; Sun et al., (2011) *Langmuir* 27: 201). The pyridyl groups are ionizable at low pH in aqueous solutions as the pKa of P4VP in water is between about 3 and about 4.5 (Kang et al., (2012) *J. Phys. Chem. B* 116: 55; Sun et al., (2011) *Langmuir* 27: 201; Satoh et al., (1989) *Macromolecules* 22: 1808; Sidorov et al., (2004) *Langmuir* 20: 3543; Chauhan et al., (2004) *J. Appl. Polymer Sci.* e 91: 2454). LbL assembly of P4VP with poly(acrylic acid) (PAA) was reported by Wang et al., ((1997) *Macromolecular Rapid Comms* 18: 509) and the authors suggested that the assembly in ethanol was mainly driven by hydrogen-bonding interaction. In methanol, the protonated carboxylic groups on PAA serve as hydrogen donors while the nitrogen atoms in pyridine groups served as hydrogen acceptors (Wang et al., (1997) *Macromolecular Rapid Comms* 18: 509). It was also found that at high pH, the LbL film disintegrated and P4VP precipitated onto the surface due to phase separation. In addition, a different ionization degree of PAA could affect the interactions between P4VP and PAA and therefore influenced the film growth and stability (Cho & Caruso (2003) *Macromolecules* 36: 2845). Sukhishvili and coworkers investigated the change in the film growing behavior of poly(methacrylic acid) (PMAA) and quaternized P4VP multilayers and found out that the interaction was dominated by electrostatic forces instead of hydrogen bonding (Kharlampieva & Sukhishvili (2003) *Langmuir* 19: 1235). Sukhorukov applied LbL assembly of PAA and P4VP onto silica particles and studied the pH-responsive properties of the hollow capsules (Mauser et al., (2006) *J. Phys. Chem. B* 110: 20246). These two-component capsules containing both P4VP and PAA could swell at both low pH=2 and high pH=8 for 23% and 70% diameter increases (Mauser et al., (2006) *J. Phys. Chem. B* 110: 20246). However, these capsules disintegrate within several hours at extreme pH values since pH-induced charges over-compensated the attractive bindings between P4VP and PAA.

The term "functional moiety" as used herein refers to any molecule that may be attached to the outer surface of the outermost layer of the cell or cell aggregate coatings of the disclosure. It is contemplated, but not intended to be limiting, for such moieties to be an imaging moiety (including a fluorescent dye, radiolabel, and the like), an immunosuppressant molecule, a cytokine, a growth factor, or any combination thereof, and the like.

The terms "swell" and "swelling" as used herein refer to when a hydrogel according to the disclosure increases in at least one dimension, such as, but not limited to, the thickness of a layered composition when in contact with an aqueous liquid and under conditions that protonate cationic groups of the hydrogels.

Description

The present disclosure is related to the novel PVP hydrogels based on layer-by-layer assembly, and their synthesis and fabrication thereof. The ultra-thin single-component LbL hydrogels of the disclosure are stable against extreme pHs and they show an enhanced swelling ratio of over 10:1 in acidic solutions compared to the swelling of currently known hydrogels. The thickness variations between pH 2 and pH 6 buffer solutions is highly reversible with a rapid response in the order of minutes. Especially advantageous, cross-linkable side groups are introduced to the copolymer, these sidegroups being able to be protonated. Suitable cationic sidegroups include amino groups, with amino groups being the preferred cations since besides enabling electrostatic repulsion when protonated, when attached to such as PVP, the copolymers are capable of being cross-linked with such as with glutaraldehyde (GA). By adjusting the average percentage of amino function in the copolymer, it is possible to control the cross-link densities, and thus the swelling ratios of the hydrogels. Additionally, the LbL assembly of non-quaternized PVP can be in buffer solutions with no additional organic solvents, thereby exploiting the fact that the water solubility of PVP is enhanced with the incorporation of hydrophilic amino groups.

It has been now found that the pH-triggered swelling properties of PVP hydrogels to be significantly affected by deposition conditions, i.e. the method used to form the multi-layered hydrogels. Thus, PVP films produced by a conventional "dipping" method experienced three times lower swelling than do their spin-assisted counterparts. In addition, PVP hydrogels dehydrated from basic and acidic solutions have significantly different surface morphologies and wettability properties. Contact angles vary from 70° to less than 10° for the films dried from neutral and acidic solutions, respectively. The compositions of the present disclosure, therefore, opens new prospects for developing novel "intelligent" materials with sharp stimuli-triggered responses for applications in sensing, transport regulation, and self-cleaning coatings.

One way to enhance the stability of weak polyelectrolytes against extreme pHs is to induce chemical cross-linking to the systems. Recently, cross-linked P4VP capsules were obtained through the cross-linking-co-precipitation process of P4VP onto silica particles using 1,4-diiodobutane as the cross-linker (Motornov et al., (2011) *Langmuir* 27: 15305). The capsules swelled 1.4-fold from their swollen to the de-swollen state. Another approach for covalent attachment of P4VP films onto silicon wafers via irradiation with UV light (Harnish et al., (2005) *Chem. Mater.* 17: 4092). Although both systems showed promising stability and pH-responsive property, they lack the control over cross-linking densities as well as the film thickness as displayed by the compositions of the present disclosure.

Figure 1B:
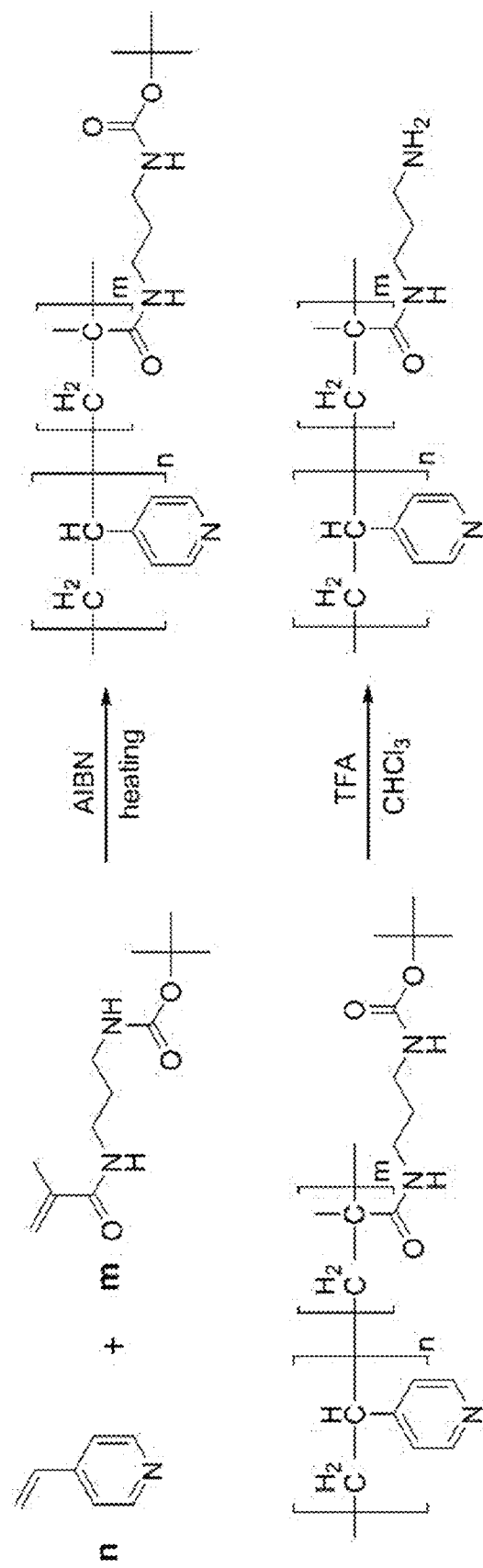
FIG. 1B shows Scheme 1 for the synthesis of poly(4-vinylpyridine-co-(aminopropyl)methacrylamide) (PVP-$NH_2$) copolymers through copolymerization and acid-catalyzed deprotection.

Synthesis of PVP-NH$_2$ copolymers: To obtain PVP hydrogels with predictable cross-linking densities and controllable swelling properties, PVP-NH$_2$ copolymers with varied amount of amino groups were synthesized. To avoid undesired side reactions caused by primary amines, the copolymers were synthesized through a two-step protocol through free radical copolymerization of 4-vinylpyridine (4VP) and N-(tert-butoxycarbonyl-aminopropyl)methacrylamide, followed by deprotection of the tert-butyloxycarbonyl (t-BOC) groups in 10% (v/v) TFA in chloroform, as shown in Scheme 1, FIG. 1B.

To assure the polydispersity index (PDI) to be lower than 1.5, AIBN was used as the initiator while the monomer conversion was controlled to be in the range of about 50 to about 60%. The deprotected copolymer PVP-NH$_2$ was further dialyzed in water at pH=8 to remove trifluoroacetate ions bound to pyridinium groups. Accordingly, PVP-NH$_2$-1, PVP-NH$_2$-4, and PVP-NH$_2$-7 copolymers were synthesized, where the numbers indicate average molar ratio of primary amino groups in the copolymers as determined with H-NMR.

Figure 2:
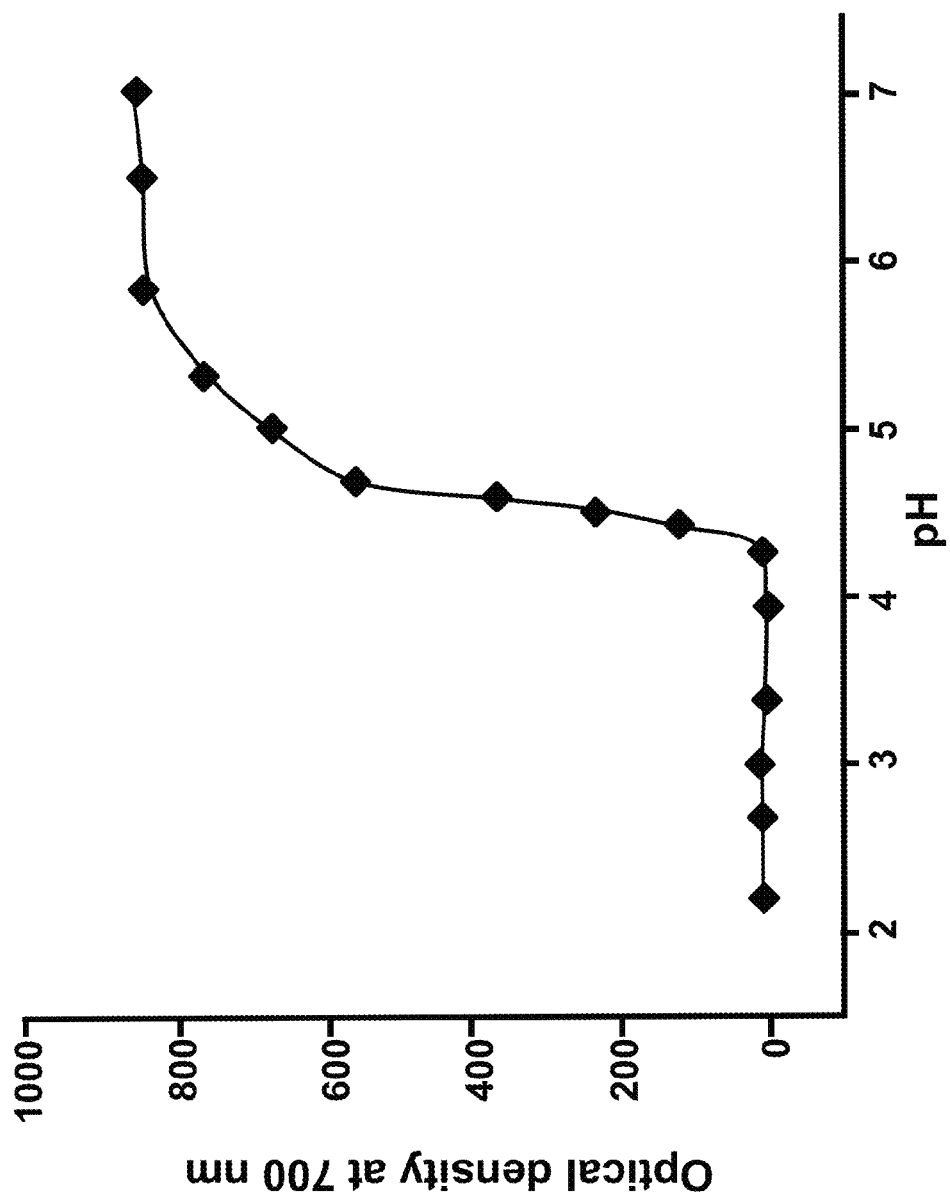
FIG. 2 shows a graph of the turbidimetry of PVP-$NH_2$-4 copolymer solutions, 0.5 mg/mL in 0.01 M sodium phosphate buffer. Scattering experiments were carried out using a spectrofluorometer at 700 nm with aqueous copolymer solutions at room temperature.

All copolymers were easily dissolved in water solutions at pH=4, unlike very slow solubility of the PVP homopolymer under the same conditions. As found from pH-titrated turbidimetric analysis, PVP-NH$_2$-4 showed a pK$_a$ of around 4.6, as shown in FIG. 2.

The optical density of the copolymer drastically increased at pH values greater than about 4.6, reaching a plateau at pH values greater than 5.5. At pH values less than 4.6, the PVP-NH$_2$ copolymer was in its water soluble state with the polymer chains in extended conformation because of the electrostatic charge repulsions between ionized pyridinium groups. When the solution pH increases above pK$_a$, the PVP-NH$_2$ copolymer starts to aggregate as a result of deprotonation of its pyridinium groups. The data are consistent with a reported PVP pK$_a$ value of approximately 3. The data indicate that the presence of cationic groups such as NH$_2$ groups with a molar ratio 4 does significantly affect the pK$_a$ of PVP. The improved solubility PVP-NH$_2$ copolymers in water as compared to PVP can be attributed to the hydrophilicity of the amino groups.

Assembly of PVP-NH$_2$/PMAA multilayers: PVP-NH$_2$ copolymers were assembled with PMAA on silicon wafers from 0.5 mg mL$^{-1}$ polymer solutions were at pH=4 using spin-assisted and dipped LbL methods. Spin-assisted assembly offers much faster deposition as compared to conventional dipping layer-by-layer (LbL) and has been found to give films with enhanced interlayer binding and the stratified internal structure.

Figure 3A:
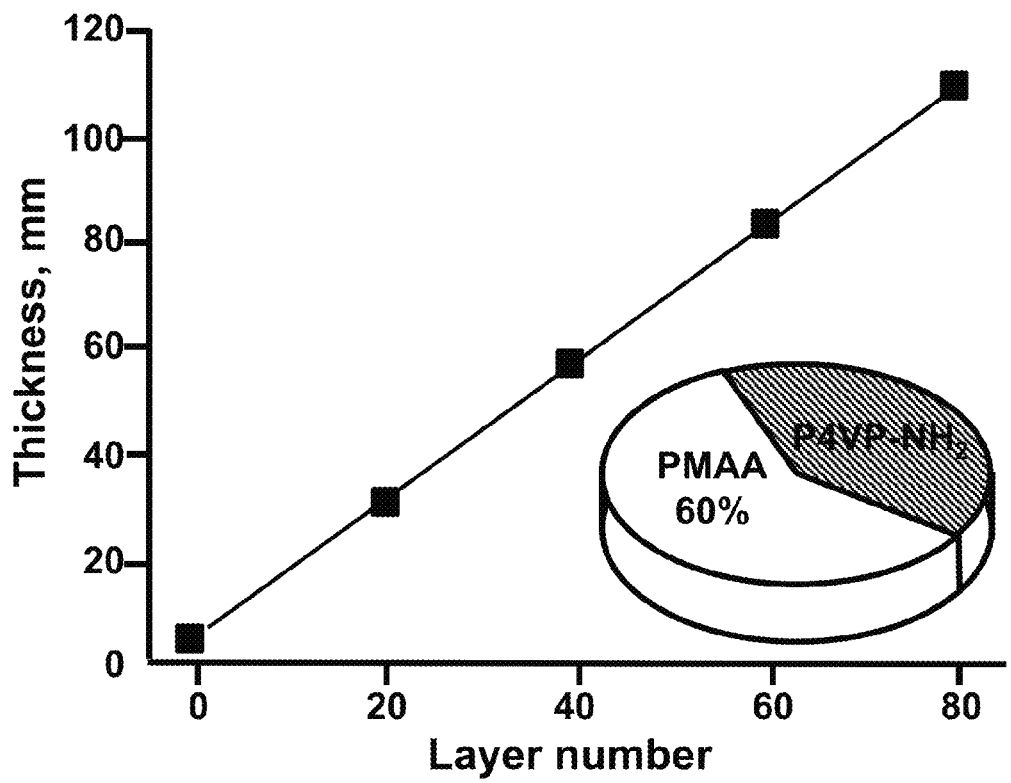
FIG. 3A is a graph illustrating the thickness growth of PVP-$NH_2$/PMAA multilayers using spin-assisted layer-by-layer (SA-LbL) assembly.
Figure 3B:
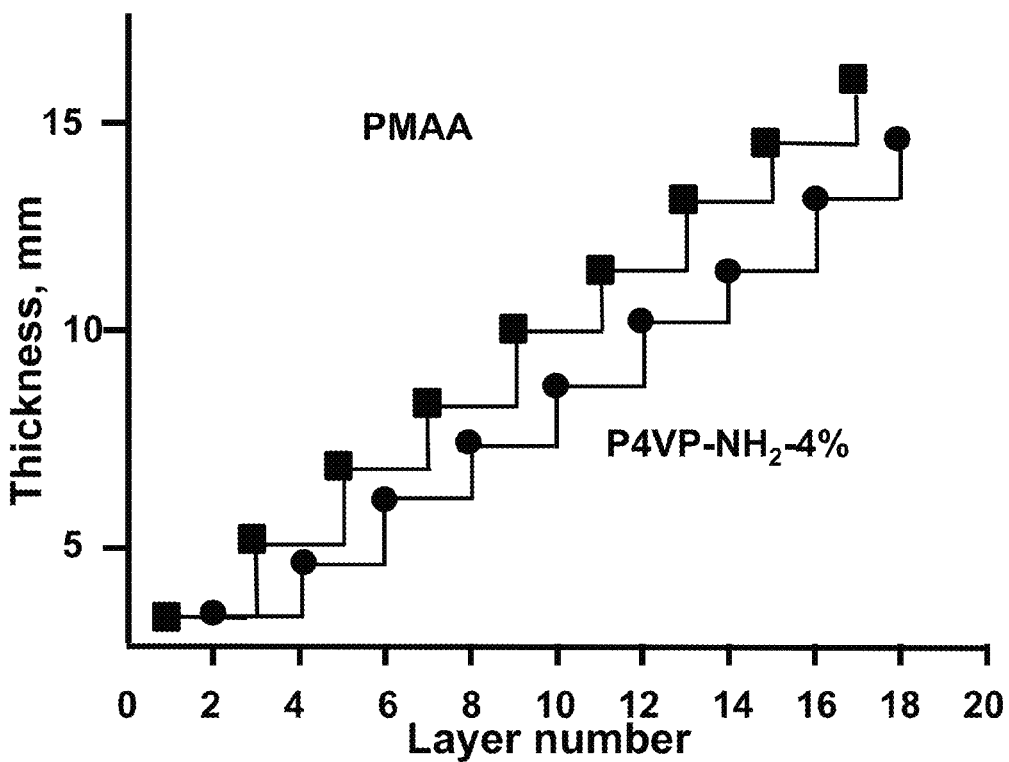
FIG. 3B is a graph illustrating the step-growth of PMAA and PVP-$NH_2$-4% layers respectively.

The thickness of a spin-assisted (PMAA/PVP-NH$_2$-4) layered film increased linearly with the average bilayer thickness of 2.6±0.1 nm, as monitored by ellipsometry (as shown in FIG. 3A). The incremental thickness of PMAA was slightly higher than that for PVP-NH$_2$-4 giving 1.5 nm and 1.1 nm, respectively. As a result, PMAA had 60% of the total adsorbed mass for a 20-bilayer film (FIG. 3B). To follow surface properties during PVP-NH$_2$-4/PMAA assembly, the contact angle at each deposition step was monitored. The contact angle alternated between 15° and 30° for PMAA and PVP-NH$_2$-4 outmost layers, respectively, indicating more hydrophobic properties of PVP-NH$_2$-4-capped layers (as shown in FIG. 4).

Figure 6:
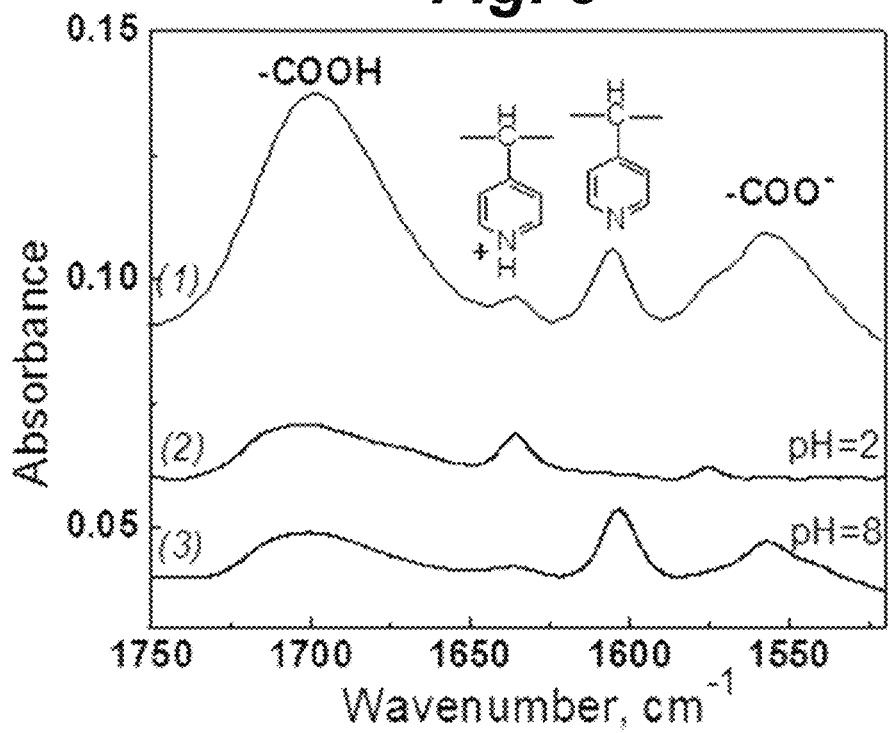
FIG. 6 is a graph illustrating FTIR spectra of a spin-assisted film as deposited at a pH of 4 (spectrum (1)), after cross-linking and exposure to a pH of 2 (spectrum (2)) and after cross-linking and exposure to a pH of 8 (spectrum (3)), as monitored by in situ ATR-FTIR in $D_2O$ solutions. Absorption bands associated with protonated carboxylic groups (—COOH), ionized carboxylic groups (—COO$^-$), ionized pyridinium rings, and uncharged pyridine rings are centered at 1700 cm$^{-1}$, 1550 cm$^{-1}$, 1643 cm$^{-1}$, and 1601 cm$^{-1}$, respectively.

Successful assembly of the film was confirmed with ATR-FTIR. The FTIR spectrum of the deposited film showed four major peaks: two absorption bands at 1700 cm$^{-1}$ and 1552 cm$^{-1}$ associated with the stretch vibrations of the protonated and ionized forms of carboxylic groups, respectively, and two bands at 1643 cm$^{-1}$ and 1601 cm$^{-1}$ associated with in-ring skeletal vibrations of ionized pyridinium and uncharged pyridine rings (as shown in FIG. 6, spectrum 1). There was also a small peak centered at 1558 cm$^{-1}$ associated with pyridinium rings. Integration of the peak intensities results in PMAA and PVP-NH$_2$-4 ionization of 19% and 13%, respectively (the absorptivity ratio of the 1643 cm$^{-1}$ to 1601 cm$^{-1}$ bands is 1.68).

While not wishing to be bound by any one theory, higher ionization of PMAA as compared to that for PVP-NH$_2$-4 may be explained by an induced ionization effect of a polycation-capped layer in electrostatically-bound multilayers. Thus, ionization of carboxylic groups in (PMAA/QPVP) film was induced when the outmost layer was QPVP, and ionization was decreased with the PMAA in the outmost layer. The results herein disclosed demonstrate that (PMAA/PVP-NH$_2$-4)$_{20}$ (i.e. 20 superimposed layer pairs) assembly is primarily driven by hydrogen-bonded interactions with a small contribution of ionic forces (less than 20%).

Figure 5:
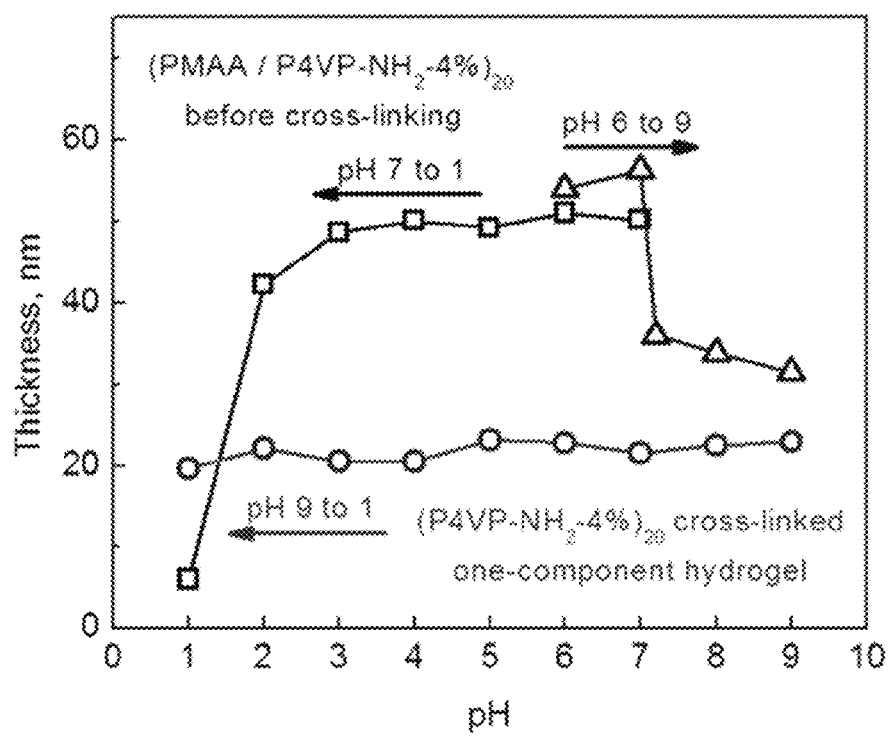
FIG. 5 is a graph illustrating the pH-dependent stability of a non-cross-linked (PMAA/PVP-$NH_2$-4%)$_{20}$ film tested from pH 7 to pH 1 (open squares), from pH 6 to pH 9 (triangles), and cross-linked one-component (PVP-$NH_2$-4%)$_{20}$ hydrogel film tested from pH 9 to 1 (circles). Thickness measurements were performed on a dry film after 30 min exposure of the film to 0.01 M phosphate buffers with appropriate pH values.

To study stability of the assembled system against pH variations, a (PMAA/PVP-NH$_2$-4) multilayer was exposed to high and low pH values. It was found the LbL film to be stable in the intermediate pH region from about 7 to about 3, without any thickness decrease, as shown in FIG. 5. However, this film disintegrated at pH values greater than about 2 and pH greater than about 7 due to complete protonation of PMAA carboxylic groups (pK$_a$ approximately 6) and de-ionization of pyridinium moieties (pK$_a$ approximately 3), respectively.

FIG. 5 shows that the (PMAA/PVP-NH$_2$-4)$_{20}$ film experiences a 14% loss in thickness at pH of about 2 followed by complete film dissolution at pH of about 1 because of the uncompensated positive charge within the film. These results correlate with the earlier reported (PMAA/QPVP) ionic multilayers which dissolved at pH greater than about 2 due to protonation of carboxylic groups and disruption of polymer/polymer ionic contacts. On the other hand, a (PMAA/PVP-NH$_2$-4)$_{20}$ film) displays a sharp decrease in thickness by 36% at pH 7.2 followed by gradual decrease to 45% of total mass loss at elevated pH values. Further increase in pH leads to continued release of the trapped PMAA due to slow reconformation of PVP chains under basic conditions.

The film of precipitated PVP was not stable against pH variations and quickly dissolved at pH of about 2. These results agree with the previously observed instability of hydrogen-bonded PVP films in elevated and acidic pH solutions. In those studies an increase in pH resulted in the release of ionized PMAA and retention of uncharged PVP. Here, coexistence of hydrogen-bonding and electrostatic interactions extended the pH stability range of PVP films, unlike pure hydrogen-bonded (PMAA/PVP) or ionic systems.

Fabrication of (PVP)$_n$ multilayer hydrogel films: To stabilize (PVP) films, PVP-NH$_2$ layers in (PMAA/PVP-NH$_2$-4) multilayers were covalently clinked. For that, glutaraldehyde was used to cross-link primary amino groups at neutral pH followed by the PMAA removal from the cross-linked hydrogel at acidic pH, as shown, for example, in FIGS. 4A and 4B.

Glutaraldehyde is a difunctional molecule known to react with amino groups to provide chemically and thermally stable cross-links in synthetic polymers and proteins. For cross-linking reactions, (PMAA/PVP-NH$_2$) LbL films were exposed to 5% glutaraldehyde solution at pH of about 6.5 for 24 hours, followed by the removal of PMAA in 1M HCl for 30 minutes, shown schematically in FIG. 1A. The thickness of the resulting single-component (PVP)$_{20}$ hydrogel decreased from 56 nm to 22 nm demonstrating a 40% thickness retained which correlated with the total mass ratio of PVP-NH$_2$ within the initial film, shown in the inset, FIG. 3A. Remarkably, the hydrogel showed excellent stability in pH range from a pH of about 1 to a pH of about 10, in contrast to non-cross-linked film erasable at a pH less than about 3 and a pH greater than about 7, as shown in FIG. 5. The hydrogel stability under extreme pH values indicated that the covalent bonding between primary amino groups and glutaraldehyde was stable under both acidic and basic conditions. Composition changes in the film after cross-linking was investigated with in situ ATR-FTIR.

The results in FIG. 6 show a cross-linked film after exposure to pH=2 (spectrum 2) and pH=8 (spectrum 3). Both spectra show that that the absorption bands associated with PMAA groups disappeared, indicating total release of PMAA from the cross-linked films. At the same time a new broad band centered at 1710 cm$^{-1}$ appeared in the spectrum which is associated with C=O vibrations from glutaraldehyde. The presence of ionized pyridinium groups at pH=2 evidences successful cross-linking of PVP-NH$_2$ (as shown in FIG. 6, spectrum 2). The pyridinium groups could be reversibly discharged to pyridine groups at pH=8, confirming hydrogel stability against pH variations (FIG. 6, spectrum 3). There was no decrease in total integrated intensities of PVP bands in the cross-linked films, which indicates complete retention of the polycation in the hydrogel.

To determine the optimum cross-linking conditions, glutaraldehyde at pH of 5 was used. However, only 28% of total film thickness remained on the surface, indicating partial P4VP removal under this condition. The results suggest that glutaraldehyde cross-linking should be performed at pH greater than or equal to about 6.5 for stable cross-linking.

pH-responsive properties of (PVP) multilayer hydrogel films: The pH-responsive swelling/shrinking properties of cross-linked (PVP)$_n$ hydrogel films were investigated in a liquid cell by in situ ellipsometry for real-time measurement. In addition to pH-triggered thickness variations, in situ measurements provide information on variation of optical properties and kinetics of swelling process.

Figure 7A:
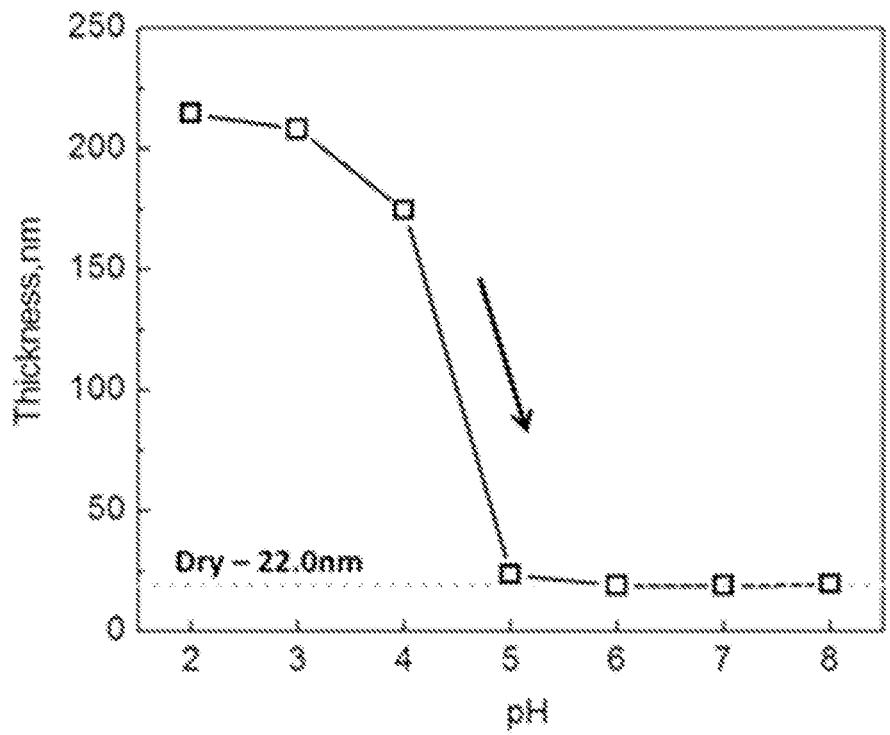
FIG. 7A is a graph illustrating a pH-triggered response of a spin-assisted (PVP)$_{20}$ hydrogel film obtained with PVP-$NH_2$-4 during the third cycle. Film thickness was measured by in situ ellipsometry in 0.01 M phosphate buffer solutions.

FIG. 7A shows (PVP) film behavior in response to changes in solution pH. It was found that a 22-nm (PVP)$_{20}$ film experienced a dramatic 10-fold swelling at pH less than about 5 indicating 95% water uptake. As seen from the swelling profile in FIG. 7A, hydrogel thickness of 22 nm remained constant at basic and neutral pH, but increased drastically to 175 nm at a pH of about 4 followed by a further increase to about 215 nm at a pH of about 2, giving a 10-fold swelling (the ratio of dry hydrogel thicknesses to that at pH=2).

Figure 7B:
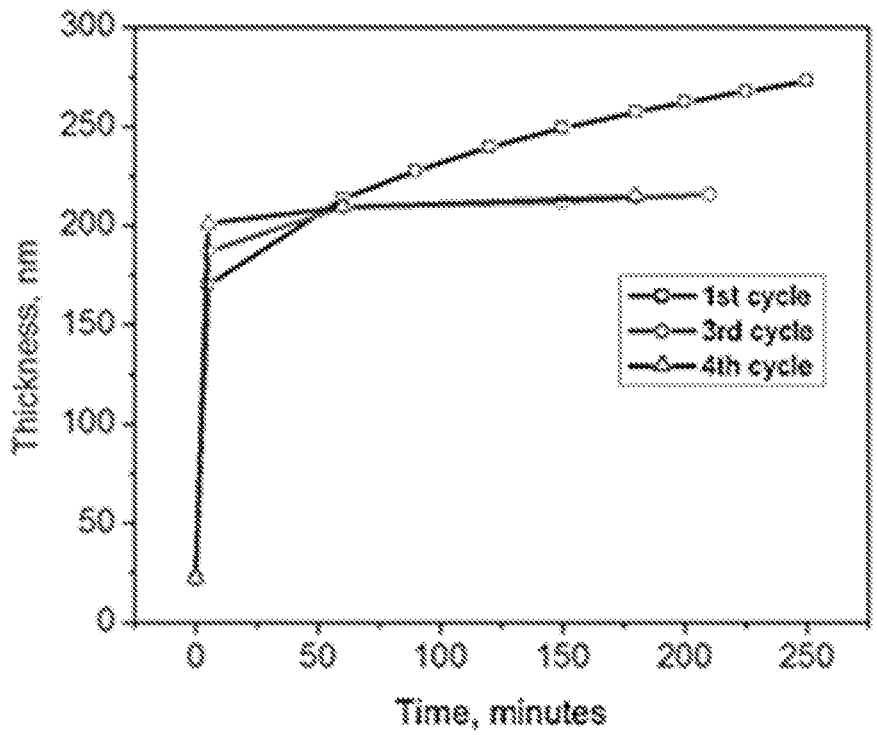
FIG. 7B is a graph illustrating kinetics of hydrogel hydration at a pH value of 2 taken at 1st, 2nd, and 3rd swelling cycles.

The corresponding refractive indices of the film decreased from 1.47 to 1.34 at pH 6 and 2, respectively, indicating a large water-uptake capability of this hydrogel at acidic pH. As seen from the kinetics plot, hydrogel swelling at pH=2 is very fast with thickness reaching equilibrium in less than one minute (FIG. 7B). This behavior is a clear demonstration of a fast response of nanothin films.

Figure 7C:
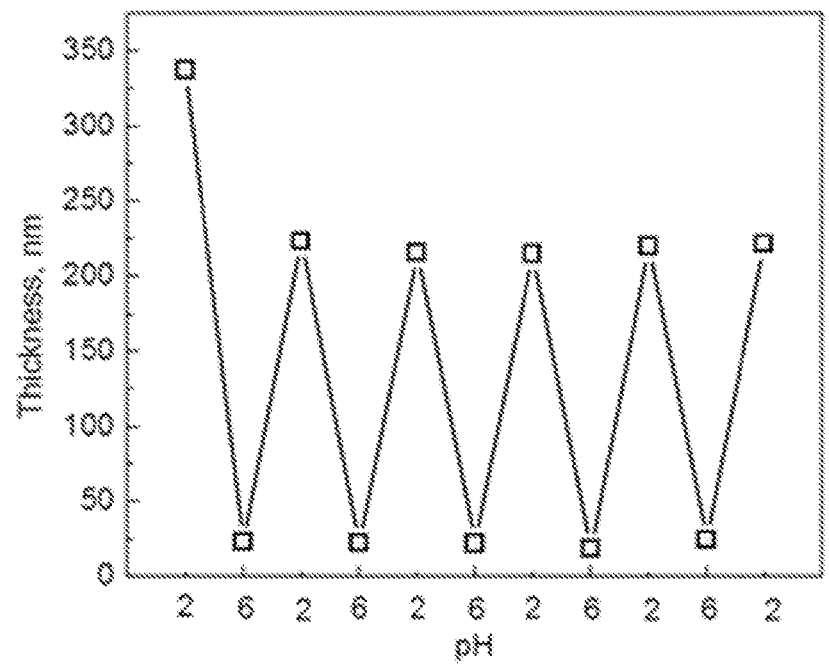
FIG. 7C is a graph illustrating reversible pH-triggered swelling-shrinking of a (PVP)$_{20}$ hydrogel film between a pH of 2 and a pH of 6.

PVP hydrogels that collapsed at pH greater than about 5 had a thickness of dry films that demonstrated highly hydrophobic properties (0% water uptake) (FIG. 7A). Cycling the film between high and low pH values shows high reproducibility of this change as the film rapidly switched between a swollen and collapsed state (FIG. 7C). Noticeably, the reversible swelling-shrinking ability of this film was preserved even after seven swelling cycles.

Based on these results, PVP multilayer hydrogel represent a unique example of an ultrathin but highly-swollen film capable of a dramatic volume change (10-fold) in a very narrow pH-range. This is in contrast with other types of PVP hydrogels obtained by UV or chemical cross-linking whose swelling ratio fell in the range of 1.5-3. The results of the present disclosure suggest that removal of PMAA from cross-linked multilayer provides a large free volume that allows the film to reactively and drastically swell or collapse unlike limited volume transitions in bulk and surface networks.

Effect of cross-linked density and chain conformations on PVP hydrogel swelling: It was found that the degree of PVP hydrogel swelling is controlled by varying amount of amino groups in the copolymer and by changing deposition conditions. To explore the effect of cross-link density on hydrogel swelling, PVP-$NH_2$-7% copolymer was used for hydrogel fabrication.

Figure 7D:
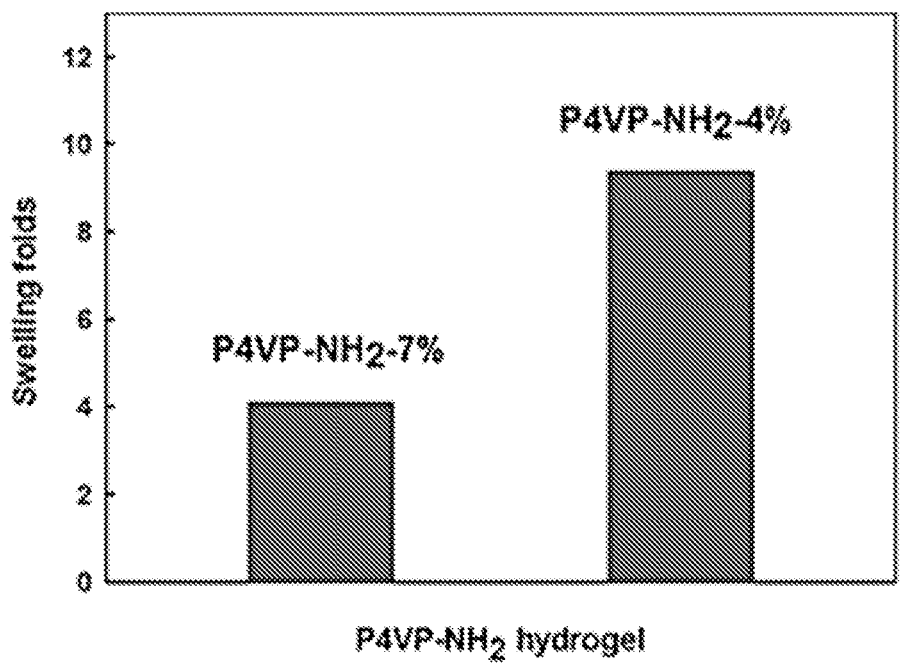
FIG. 7D is a graph illustrating swelling folds of spin-assisted (PVP)$_{20}$ and (PVP)$_{15}$ hydrogel films obtained with PVP-$NH_2$-4 and PVP-$NH_2$-7, respectively. Swelling folds are calculated as the ratios in hydrogel thicknesses at a pH of 2 and a pH of 6.

FIG. 7D compares swelling ratios of films derived from PVP-$NH_2$-7% and PVP-$NH_2$-4%. As expected, an increase in the amount cross-linkable groups in the polymer from 4 to 7% significantly suppressed hydrogel swelling. The film made of PVP-$NH_2$-7% underwent approximately 4-fold swelling (a change in thickness from 15 to 66 nm at pH=6 and 2, respectively), which is twice less than the swelling degree of a (PVP-$NH_2$-7)-derived hydrogel. In a control experiment, PVP-$NH_2$-1% was used for hydrogel fabrication. However, the film disintegrated at a pH greater than about 7, indicating that 1% of the groups was not sufficient for cross-linking.

To quantify cross-link density in PVP hydrogels, the theoretical number of possible cross-links per chain (the cross-link density) was estimated based on the number of amino-bearing units in the copolymer and its molecular weight. Thus, given 4% of the amino-bearing units in PVP-$NH_2$-4 copolymer and $M_w$ of 152 587 g $mol^{-1}$, the calculations suggested that there were 25 PVP monomer units between two cross-links (assuming saturated conversion of all amino groups), or, on average, 57 cross-links per polymer chain. For the hydrogel with 7% of amino-bearing units and the copolymer $M_w$ of 141641 g $mol^{-1}$, it was calculated that there were 14 PVP monomer units between two cross-links, or 92 cross-links per polymer chain. Thus, the increase in the amount of cross-linkable groups from 4% to 7% resulted in the decreased number of PVP units between two cross-links from 25 to 14. The corresponding cross-link density increased from 57 to 92 cross-links per chain for the hydrogels derived from PVP-$NH_2$-4 and PVP-$NH_2$-7, respectively.

Figure 8:
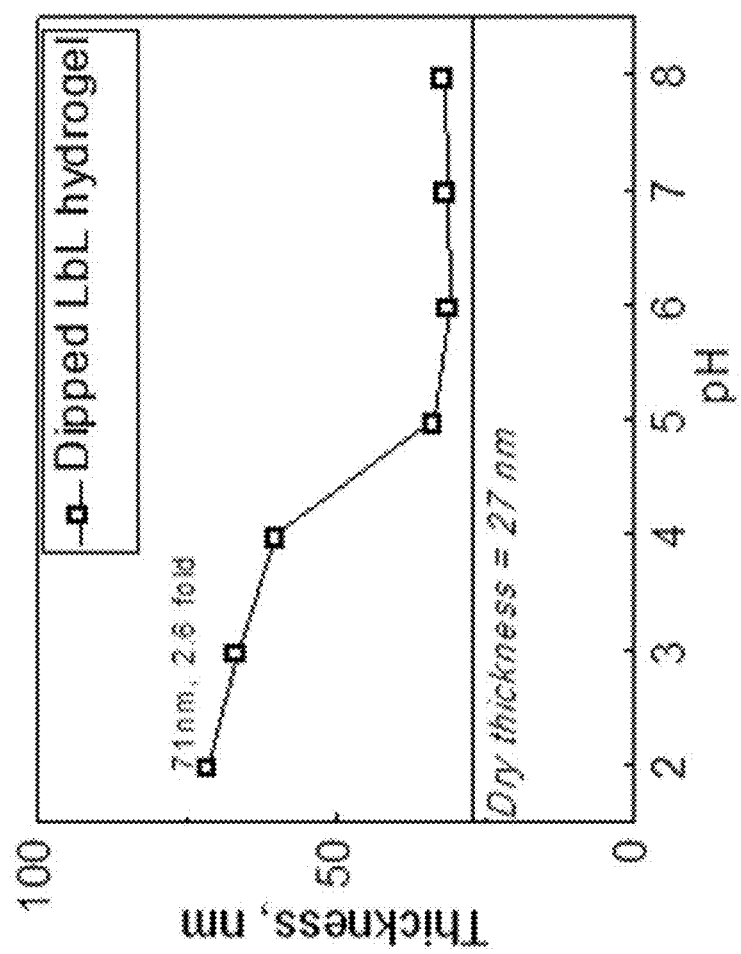
FIG. 8 is a graph illustrating a pH-triggered response of a dipped (PVP)$_{20}$ hydrogel film obtained with PVP-$NH_2$-4. Film thickness was measured by in situ ellipsometry in 0.01 M phosphate buffer solutions.

To investigate the effect of deposition conditions on hydrogel swelling, a conventional "dipping" method was used for LbL assembly of PVP-$NH_2$-4/PMAA film. The swelling profile of a dipped $(PVP)_{20}$ hydrogel is shown in FIG. 8. Unlike 10-fold swelling in spin-assisted film, the dipped hydrogel, 27 nm thick dry, swells only to 2.6 times at acidic pH value.

These results show that dipped PVP films experience significantly suppressed pH-triggered swelling, 2.6-fold (70 v/v % of water uptake), unlike 10-fold swelling (95 v/v % of water uptake) in spin-assisted hydrogels. These observations agree with findings on anionic PMAA multilayer hydrogels showing pH-triggered swelling/shrinkage as a result of protonation/ionization of PMAA carboxylic groups. There, the spin-assisted PMAA film exhibited a 10-fold increase in thickness between a pH of about 5 and about 7.5, compared with a 2-fold swelling in dipped hydrogels. The difference in swelling was attributed to various chain conformations adopted during assembly. It was found with neutron reflectivity that spin-assisted cross-linked networks had well-organized internal layering, in contrast to highly interdiffused dipped hydrogels. Spin-assisted assembly resulted in polymer chains deposited in a mobility-limited state. In this case, loops and entanglements being 'frozen' after deposition expand at high pH, providing the needed free volume for swelling. In contrast, entanglements in more interdiffused polymer chains in the dipped films decrease free volume, significantly constraining hydrogel swelling. Similarly, greater swelling of spin-assisted PVP hydrogels can be attributed to stratified structures unlike suppressed swelling in their less organized intermixed dipped counterparts.

Figure 9A:
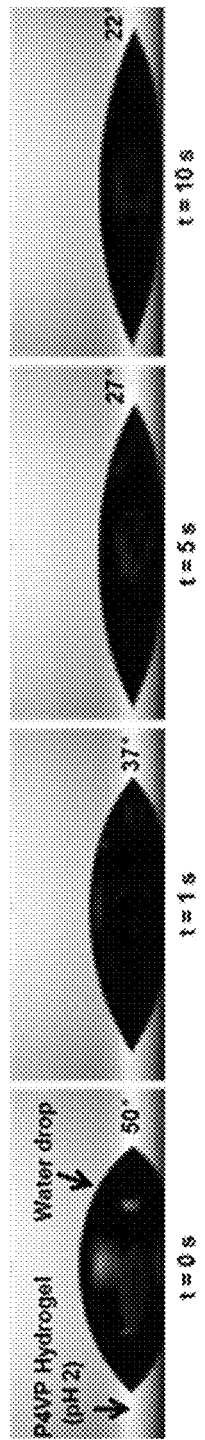
FIG. 9A shows a series of digital images illustrating surface wettability of (PVP)$_{20}$ hydrogel films obtained with PVP-$NH_2$-4. Shown is the contact angle change of a water drop over 10 sec of contact with a (PVP)$_{20}$ hydrogel film that had been immersed in phosphate buffer at pH 2 for 12 h.
Figure 9B:
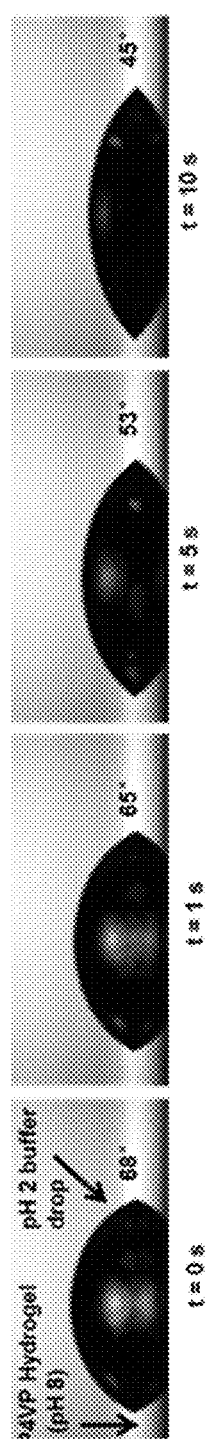
FIG. 9B shows a series of digital images illustrating surface wettability of (PVP)$_{20}$ hydrogel films obtained with PVP-$NH_2$-4. Shown is the contact angle change of a pH 2 buffer drop over 10 sec of contact with a (PVP)$_{20}$ hydrogel film that had been immersed in phosphate buffer at pH 8 for 12 h.
Figure 9C:
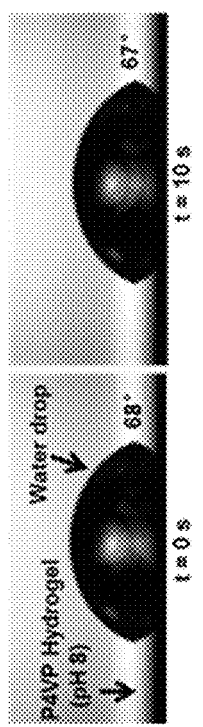
FIG. 9C shows a series of digital images illustrating surface wettability of (PVP)$_{20}$ hydrogel films obtained with PVP-$NH_2$-4. Shown is the contact angle change of a water drop over 10 sec of contact with a (PVP)$_{20}$ hydrogel film that had been immersed in phosphate buffer at pH 8 for 12 h.
Figure 9D:
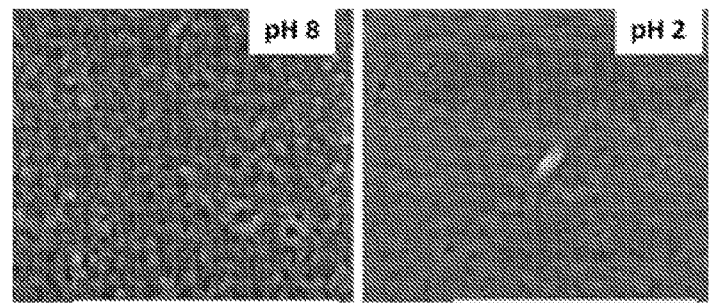
FIG. 9D shows a pair of digital SEM images of a (PVP)$_{40}$ hydrogel film obtained with PVP-$NH_2$-4 after exposure to a pH of 8 (left image) and a pH of 2 (right image). Scale bars represent 1 μm in both pictures.
Figure 9E:
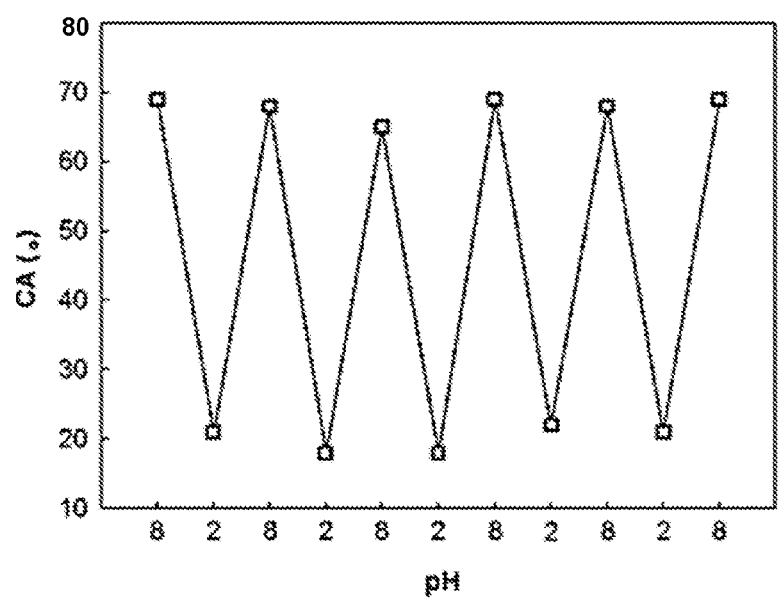
FIG. 9E is a graph illustrating a reversible pH-triggered change in contact angle of a (PVP)$_{20}$ hydrogel film obtained with PVP-$NH_2$-4. Each contact angle was measured after immersing in buffer at certain pH values for 12 h.

Wettability of $(PVP)_n$ hydrogel films: Surface wettability of $(PVP)_{20}$ hydrogels were characterized by contact angle (CA) measurements. Accordingly, droplets of deionized water were deposited on hydrogels dried from acidic and basic solutions. Hydrogels dehydrated after exposure to a pH of about showed water CA of 68°, which remained unchanged for at least 10 sec, as shown in FIG. 9C. As expected, hydrogels dried from acidic pH displayed more hydrophilic properties with a CA changing from 50° to 22° within 10 sec (FIG. 9A).

In another experiment, droplets of buffer at pH of about 2 were applied and the hydrogels dried from basic pH. The CA decreased slowly from 68° to 45° (as shown in FIG. 7B), indicating a gradual decrease in surface hydrophobicity as a result of PVP ionization upon contact with a pH=2 solution.

The variation of CA was highly reversible when the surface switched from hydrophilic (CA of about 20°) to hydrophobic (CA of about 7°) when measured on a hydrogel dried from pH=2 and pH=8, respectively (as shown in FIG. 7E).

To investigate surface morphology of hydrogels in hydrophobic and hydrophilic states, SEM was applied to (PVP) hydrogels treated at pH=8 and pH=2, respectively. The film dried from basic solutions showed grainy and porous morphology, unlike the relatively smooth surface observed for the hydrogel treated with acidic pH. Porous PVP surfaces were obtained previously by solvent-induce phase separation in PVP/PMAA films. These results demonstrate that PVP hydrogels dehydrated from basic and acidic solutions have drastically difference morphology and wettability properties. Hydrophobic properties of collapsed hydrogels are not affected by water contact, because the pH of deionized water is normally above 5. However, when the hydrogel is dried from fully ionized form in acidic buffer, positively charged pyridyl groups make the surface easily hydrated.

One aspect of the disclosure, therefore, encompasses embodiments of a pH-responsive layered composition comprising at least two spin-assisted layer-by-layer spun copolymer layers, where the spun layers have a plurality of cationic side-groups attached thereto, and where the spun layered composition when hydrated swells when protonated and has a reduced volume when deprotonated.

In the embodiments of this aspect of the disclosure, the at least two spin-assisted layer-by-layer spun copolymer layers can be cross-linked.

In the embodiments of this aspect of the disclosure, the at least two spun copolymer layers can be comprised of a poly-vinylpyridine polymer.

In the embodiments of this aspect of the disclosure, the at least two copolymer spun layers consist essentially of copolymers (PVP-NH$_2$-m) of poly(4-vinylpyridine-NH$_2$-1), poly(4-vinylpyridine-NH$_2$-4), or poly(4-vinylpyridine-NH$_2$-7).

In the embodiments of this aspect of the disclosure, the at least two copolymer spun layers can be separated by alternating spun copolymer layers comprising a copolymer comprising poly(methacrylic acid).

In the embodiments of this aspect of the disclosure, the cross-linkable side-groups can be carboxylate groups, cationic amino groups, or a combination thereof.

In the embodiments of this aspect of the disclosure, the cationic side-groups can be amino groups.

In the embodiments of this aspect of the disclosure, the copolymer spun layers can be cross-linked with glutaraldehyde.

In the embodiments of this aspect of the disclosure, the pH-responsive layered composition can comprise from 2 to about 50 spun layers, where each of the spun layers comprises a poly(vinylpyridine-NH$_2$) copolymer or alternates with a spun layer that can comprise a poly(methacrylic acid) copolymer.

Another aspect of the disclosure encompasses embodiments of a pH-responsive spin-assisted layer-by-layer layered composition comprising at least two glutaraldehyde cross-linked spun layers of a copolymer comprising 4-vinylpyridine and having a plurality of amino side-groups attached thereto, and wherein the spun layered composition when hydrated swells when protonated and has a reduced volume when deprotonated.

In the embodiments of this aspect of the disclosure, the pH-responsive layered composition can comprise spun layers of a copolymer consisting essentially of 4-vinylpyridine, and where the layered composition is substantially dehydrated.

Still another aspect of the disclosure encompasses embodiments of a method of forming a pH-responsive composition, the method comprising the steps of: (a) generating a polyvinylpyridine copolymer having a plurality of cross-linkable side-groups attached thereto; (b) generating a layer-by-layer composition by spin-assisted deposition of the polyvinylpyridine copolymer on a support material; and (c) cross-linking the spun layers of the layer-by-layer composition, thereby generating a pH-responsive spin-assisted layer-by-layer layered composition comprising at least two cross-linked spun polyvinylpyridine copolymer layers, where the spun-layered composition when hydrated reversibly swells when protonated.

In the embodiments of this aspect of the disclosure, the method can further comprise the steps of: generating a poly(methacrylic acid) copolymer; spin-assisted deposing the poly(methacrylic acid) copolymer on each of the polyvinylpyridine copolymer layers; cross-linking the polyvinylpyridine copolymer layers; and removing poly(methacrylic acid) copolymer layers under acid conditions.

In the embodiments of this aspect of the disclosure, the support material can be a silicon surface, and wherein the support material can be coated with an agent enhancing the attachment of a copolymer layer to the silicon surface.

In the embodiments of this aspect of the disclosure, the agent coating the silicon surface can be poly(glycidylmethacrylate).

In the embodiments of this aspect of the disclosure, the pH-responsive spin-assisted layer-by-layer layered composition consists essentially of cross-linked layers of a poly(vinylpyridine-NH$_2$).

In the embodiments of this aspect of the disclosure, the method can further comprise the step of drying the spin-assisted layer-by-layer layered composition.

In the embodiments of this aspect of the disclosure, the method can further comprise the step of displacing the composition from the support material.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include±1%, ±2%, ±3%, ±4%, ±5%, ±6%, ±7%, ±8%, ±9%, or ±10%, or more of the numerical value(s) being modified.

EXAMPLES

Example 1

Materials: Poly(methacrylic add) (PMAA, 40 wt % aqueous solution, average Mw 4,000-6,000 g mol$^{-1}$), chloroform, 2,2'-azobis(2-methylpropionitrile) (AIBN), trifluoroacetic acid (TF A), glycidyl methacrylate (GMA), poly(ethyleneimine) (PEI, Branched or linear average Mw 25,000 g mol$^{-1}$), sodium phosphate monobasic (NaH$_2$PO$_4$), sodium phosphate dibasic (Na$_2$HPO$_4$) and hydrochloric acid (HCl, about 36 wt %) were purchased from Sigma-Aldrich. N-(tert-butoxycarbonyl-aminopropyl)methacrylamide (t-BOCAPMA) was from Polysciences, Inc. Ultrapure de-ionized water with the resistivity of 0.055 μS/cm (18.2 Ωm) was used in all experiments (Siemens). 4-Vinylpyridine was purchased from Acros and distilled before use. Initiator, AIBN, was re-crystallized from methanol at 30° C. Glutaraldehyde (GA, 25 wt % aqueous solution), 1,4-dioxane, diethyl ether, hexane, methanol were purchased from Fisher Scientific and used without further purification.

Example 2

Synthesis of poly(4-vinylpyridine-co-(aminopropyl)methacrylamide) (PVP-NH$_2$-m) Copolymers: Poly(4-vinylpyridine-co-(aminopropyl)methacrylamide) copolymers PVP-NH$_2$-m, where 'm' represents the molar percentage of the amino group copolymer units present in the copolymer, were synthesized by free radical copolymerization of 4-vinylpyridine (4VP) and t-BOC. For the synthesis of PVP-NH$_2$-4% (to yield PVP-co-tBOC copolymer with 4% of tBOC units), 2.0 mL of 4-VP, 0.23 g of tBOC, and 10 mg of AIBN were dissolved in 4.5 mL of chloroform, and the solution was degassed by three freeze-thaw cycles in a Schlenk tube.

The mixture was filled with nitrogen, sealed and heated to 68° C. with stirring. After heating for 5 h, the reaction was terminated by adding 20 mL of chloroform and precipitating the copolymer into petroleum ether (250 PVP-co-tBOC was redissolved in chloroform (20 mL) and precipitated in petroleum ether (250 mL) twice followed by drying under vacuum. The tert-butyloxycarbonyl (t-BOC) groups were hydrolyzed in 10 (v/v) % trifluoroacetic add (TFA) solution in $CHCl_3$ under stirring. The copolymer was dialyzed in deionized water using a Spectra/Por Float-A-Lyzer with a MWCO of 10,000 g $mol^{-1}$. During dialysis, the $PVP-NH_2$ was allowed to precipitate by adjusting the aqueous solution with NaOH to pH 8. After 24 h, the solution was changed to pH 2 to dissolve all precipitated copolymers. This process was repeated twice to remove trace amounts of trifluoroacetate. Composition of $PVP-NH_2$ copolymers was determined using H-NMR. The weight-average molecular weight of $P4VP-NH_2$ copolymers was determined by GPC (Waters) in N,N-dimethylformamide (DMF) using linear polystyrene standards.

Example 3

LbL assembly of $(PMAA/PVP-NH_2)_n$ multilayer films: $(PMAA/PVP-NH_2)_n$ were deposited onto silicon wafers using dipping or spin-assisted layer-by-layer method (SA-LbL). To enhance the surface adhesion of subsequently grown multilayers, a layer of poly(glycidyl methacrylate) (PGMA) was covalently bound to silica surface. For that, PGMA solution in 2-butanone (0.5 mg $mL^{-1}$) was deposited through SA-LbL (3000 rpm) and then the wafer was heated at 110° C. for 1 h. Unattached PGMA was removed by 30 s sonication in acetone. The wafer was heated at 70° C. in 1 mg $mL^{-1}$ PEI solution in 2-propanol for 4 h to covalently attach the PEI precursor.

Unattached PEI was removed by rinsing with ethanol and water. The assembly of the $(PMAA/PVP-NH_2)$ films was then performed from 0.5 mg $mL^{-1}$ buffer solutions at pH=4 (0.01 M phosphate buffer). After depositing a desired number of polymer bilayers, the films were cross-linked with glutaraldehyde (GA). The cross-linking reaction was carried out in 5% aqueous GA at pH=6.5 (0.01 M phosphate buffer) for 24 h. The surface-anchored films were then rinsed with deionized water and transferred to 1 M HCl solutions to release PMAA from the cross-linked PVP hydrogel films. The films were then deswelled by exposure to deionized water and dried with a gentle stream of nitrogen. The dipped LbL films were constructed similarly using PGMA priming described above.

Example 4

Scanning Electron Microscopy (SEM). SEM analysis was performed using a FEI Quanta™ FEG microscope at 10 kV. Surface-attached films were sputter-coated with 5 nm silver layer before imaging using a Denton Vacuum sputter-coater.

Example 5

Ellipsometry: Film thickness measurements were performed using a M2000U spectroscopic ellipsometer on silicon wafers. Silicon wafers were cut into 5 cm×2 cm substrates and cleaned by immersion in piranha solution for 1 h. Prior to use, substrates were thoroughly rinsed with deionized water, dried under a stream of filtered nitrogen and used immediately thereafter. Wafers containing cross-linked hydrogel multilayers were exposed to 1 M HCl for 24 h to remove poly(methacrylic acid), transferred to pH=4 to de-swell the films, and dried. For dry film measurements, surface-tethered films were dried under a stream of nitrogen. Measurements were performed between 400 nm and 1000 nm at 65°, 70°, and 75° angles of incidence. For data interpretation, the ellipsometric angles, ψ and Δ, were fitted using a multilayer model composed of silicon, silicon oxide, and the multilayer film to obtain the thickness of films. The thickness of $SiO_2$ was measured for each wafer and was determined using known optical constants. The thickness of the multilayer film was obtained by fitting data with the Cauchy approximation with the refractive index as $n(\lambda)=A_n+B_n/\lambda^2+C_n/\lambda^4$, with $A_n=1.5$, $B_n=0.01$, and $C_n=0.0$. Studies of film swelling were performed using a 5 mL liquid flow-through cell. The cell was filled with 0.01 M phosphate buffer solution at various pH values and measurements were taken after 30 minutes of equilibration. The thickness of the film at each pH was obtained by fitting data with the Cauchy approximation with permitted fitting of $A_n$, $B_n$, and $C_n$. The mean squared error for data fitting was less than 50.

Example 6

Fourier Transform Infrared Spectroscopy (FTIR): For characterization of synthesized polymers, infrared spectra were collected using a Bruker Vertex 70 FTIR spectrometer. Spectra were collected from the polymers evaporated from 0.5 mg $mL^{-1}$ polymersolutions in methanol. The solutions were dropped onto potassium bromide pellets followed by methanol evaporation. For monitoring in situ growth and chemical cross-linking of $(PMAA/PVP-NH_2-4)$ films, in situ Attenuated Total Reflection Fourier Transform Infrared spectroscopy measurements (ATR-FTIR) were performed. A Bruker FTIR spectrometer (Vertex 70) was equipped with a narrow-band mercury cadmium telluride detector. The internal compartment of the FTIR spectrometer containing liquid cell was purged with dry nitrogen. The ATR surface was rectangular trapezoidal multiple reflection silicon crystal of dimension 50 mm×10 mm×2 mm (Harrick Scientific) whose beam entrance and exit surfaces were cut at 45 degrees. Interferograms were collected at 4 $cm^{-1}$ resolution, and the number of averaged scans was 120. Each interferogram was corrected on the corresponding background, measured for the same ATR cell with the same $D_2O$ buffer solution. The bare ATR crystal was used as a background.

To eliminate overlap of the IR bands in the 1700-1500 $cm^{-1}$ region with the strong water band, $D_2O$ with 99.9% isotope content was utilized. Use of multiple-reflection ATR along with a custom-made flow-through liquid cell allowed us in situ deposition and compositional monitoring of the ultrathin films (several nanometers in thickness). Briefly, a PEI/PSS/PEI film was adsorbed first from 0.5 mg $mL^{-1}$ (0.01 M buffer) in $D_2O$ solutions onto the surface of the oxidized silicon crystal at pH=3.5 with deposition time of 10 min, and after that the polymer solution was replaced by the pure buffer solution in $D_2O$. Then, PMAA was adsorbed in a similar way from 0.5 mg $mL^{-1}$ buffer solutions in $D_2O$ at pH=4 for 10 min followed by a rinse at the same pH value and then by the P4VP copolymer. The assembly was repeated until a desired multilayer was built. The absorption peaks were baseline-corrected and analyzed with Galactic Grams/32 software using curve-fitting of the absorption peaks. In the fitting procedure the wavenumbers, widths, and Gaussian band profiles were fixed, but peak intensities were varied for different spectra.

Example 7

Contact angle measurements: Wetting of the film surfaces was measured by determining contact angles using optical measurements. Five microliters of water droplets were deposited on the films at room temperature and the contact angles were automatically acquired by means of a ThetaLite 101 tensiometer (Biolin Scientific).

What is claimed:

1. A pH-responsive layered composition comprising at least two spin-assisted layer-by-layer spun copolymer layers, wherein the spun layers have a plurality of cross-linkable side-groups attached thereto, and wherein the spun layered composition when hydrated swells when protonated and has a reduced volume when deprotonated, wherein the at least two spun copolymer layers are comprised of a polyvinylpyridine copolymer and are cross-linked.

2. The pH-responsive layered composition of claim 1, wherein the at least two copolymer spun layers consist essentially of copolymers (PVP-$NH_2$-m) of poly(4-vinylpyridine-$NH_2$-1), poly(4-vinylpyridine-$NH_2$-4), or poly(4-vinylpyridine-$NH_2$-7).

3. The pH-responsive layered composition of claim 1, wherein the at least two copolymer spun layers are separated by alternating spun copolymer layers comprising a copolymer comprising poly(methacrylic acid).

4. The pH-responsive layered composition of claim 1, wherein the cross-linkable side-groups are carboxylate groups, cationic amino groups, or a combination thereof.

5. The pH-responsive layered composition of claim 4, wherein the cross-linkable side-groups are cationic amino groups.

6. The pH-responsive layered composition of claim 1, wherein the copolymer spun layers are cross-linked with glutaraldehyde.

7. The pH-responsive layered composition of claim 1, comprising from 2 to about 50 spun layers, wherein each of the spun layers comprises a poly(vinylpyridine-$NH_2$) copolymer or alternates with a spun layer comprising a poly(methacrylic acid) copolymer.

8. A pH-responsive spin-assisted layer-by-layer layered composition comprising at least two glutaraldehyde cross-linked spun layers of a copolymer comprising 4-vinylpyridine and having a plurality of amino side-groups attached thereto, and wherein the spun layered composition when hydrated swells when protonated and has a reduced volume when deprotonated.

9. The pH-responsive layered composition according to claim 8, comprising spun layers of a copolymer consisting essentially of 4-vinylpyridine, and wherein the layered composition is substantially dehydrated.

10. A method of forming a pH-responsive composition, the method comprising the steps of:
    (a) generating a polyvinylpyridine copolymer having a plurality of cross-linkable side-groups attached thereto;
    (b) generating a layer-by-layer composition by spin-assisted deposition of the polyvinylpyridine copolymer on a support material; and
    (c) cross-linking the spun layers of the layer-by-layer composition, thereby generating a pH-responsive spin-assisted layer-by-layer layered composition comprising at least two cross-linked spun polyvinylpyridine copolymer layers, wherein the spun-layered composition when hydrated reversible swells when protonated.

11. The method according to claim 10, further comprising the steps of:
    generating a poly(methacrylic acid) copolymer;
    spin-assisted deposing the poly(methacrylic acid) copolymer on each of the polyvinylpyridine copolymer layers;
    cross-linking the polyvinylpyridine copolymer layers; and
    removing poly(methacrylic acid) copolymer layers under acid conditions.

12. The method according to claim 10, wherein the support material is a silicon surface, and wherein the support material is coated with an agent enhancing the attachment of a copolymer layer to the silicon surface.

13. The method according to claim 12, wherein the agent coating the silicon surface is poly(glycidylmethacrylate).

14. The method according to claim 10, wherein the pH-responsive spin-assisted layer-by-layer layered composition consists essentially of cross-linked layers of a poly(vinylpyridine-$NH_2$).

15. The method according to claim 10, further comprising the step of drying the spin-assisted layer-by-layer layered composition.

16. The method according to claim 10, further comprising the step of displacing the composition from the support material.

* * * * *